(12) United States Patent
Nakamura

(10) Patent No.: US 7,657,976 B2
(45) Date of Patent: Feb. 9, 2010

(54) HANGER

(75) Inventor: Nobuo Nakamura, Osaka (JP)

(73) Assignee: Takiya Co., Ltd, Osaka (JP)

( * ) Notice: Subject to any disclaimer, the term of this patent is extended or adjusted under 35 U.S.C. 154(b) by 526 days.

(21) Appl. No.: 11/516,636

(22) Filed: Sep. 7, 2006

(65) Prior Publication Data
US 2008/0029673 A1  Feb. 7, 2008

(30) Foreign Application Priority Data
Aug. 3, 2006  (JP)  ............... 2006-212034

(51) Int. Cl.
*A47G 1/16* (2006.01)
(52) U.S. Cl. .................... 24/136 A; 248/493
(58) Field of Classification Search ........... 248/489, 248/493, 328, 340, 339, 322; 24/136 A, 24/136 R, 265 H, 115 L
See application file for complete search history.

(56) References Cited

U.S. PATENT DOCUMENTS 2,538,757 A * 1/1951 Bratthauer et al. ............ 403/27
6,263,572 B1 * 7/2001 Hattan ....................... 29/896.7

FOREIGN PATENT DOCUMENTS

JP    2005124595 A  *  5/2005

* cited by examiner

*Primary Examiner*—James R Brittain
(74) *Attorney, Agent, or Firm*—Birch, Stewart, Kolasch & Birch, LLP

(57) ABSTRACT

A hanger allows a height position of an object to adjusted easily after the object is hung when hanging the object using wire rope. The hanger includes wire rope inserted through a lock case and has a wire grip mechanism and a hook, wherein a height position of the lock case with respect to the wire rope can be adjusted after the object is hung on the hook.

2 Claims, 8 Drawing Sheets

HANGER

BACKGROUND OF THE INVENTION

The present invention relates to a hanger for hanging an object by using wire rope and particularly to a hanger a position of which in the height direction is adjustable.

Although there is no limit to the object to be hung, the hanger is useful when used for exhibiting a picture and the like in an art gallery, a museum, and the like, because a height of the picture can be adjusted easily.

FIGS. 1 and 2 are schematic views of exhibition of the pictures or the like in the art gallery, the museum, or the like. FIG. 1 is a front view and FIG. 2 is a left side view.

Exhibits 1 such as pictures are hung by using hangers 4 from a rail 3 disposed in an upper position on a wall face 2 and parallel to a ceiling.

Normally, a long time has passed since the exhibit 1 such as a picture in the art gallery, the museum, or the like was produced. A frame of the exhibit 1 was produced in the same age as the picture or the like, a long time has passed since the production, and the frame has been distorted in most cases.

As shown in FIG. 1, each exhibit 1 is hung by using hangers 4 in two positions and it is necessary to adjust a height position after hanging in most cases.

In hanging the object by using wire rope, development of a hanger with which a height position of an object can be adjusted easily after hanging is desired.

In order to provide a hanger with which an object is hung by using wire rope and then a height position of the object can be adjusted easily, according to the invention, there is provided a hanger with wire rope inserted through a lock case and having a wire grip mechanism and a hook, wherein a height position of the lock case with respect to the wire rope can be adjusted after an object is hung on the hook.

Furthermore, in order to provide a hanger with which an object is hung by using wire rope and then a height position of the object can be adjusted easily, according to the invention, there is provided a hanger with wire rope inserted through a lock case and having a wire grip mechanism and a hook, wherein a height position of the lock case with respect to the wire rope can be adjusted after an object is hung on the hook and the hanger has a scale for indicating an amount of height adjustment.

Moreover, in order to provide a hanger with which an object is hung by using wire rope and then a height position of the object can be adjusted easily, according to the invention, there is provided a hanger comprising: a wire retaining member which is housed in a lock case and through which wire rope is inserted; a cylindrical wire grip fitted over a lower portion of the wire retaining member and having a wire grip mechanism together with the wire retaining member; an adjusting shaft member with its upper portion screwed over the wire grip; an adjusting dial positioned in a window hole formed at a lower portion of the lock case and screwed over the adjusting shaft member; and a coil spring provided in a compressed state between a lower end of the wire retaining member and an upper end of the adjusting shaft member, wherein a height position of the lock case with respect to the wire rope can be adjusted by turning the adjusting dial.

Furthermore, in order to provide a hanger with which an object is hung by using wire rope and then a height position of the object can be adjusted easily, according to the invention, there is provided a hanger comprising: a wire retaining member which is housed in a lock case and through which wire rope is inserted; a cylindrical wire grip fitted over a lower portion of the wire retaining member and having a wire grip mechanism together with the wire retaining member; an adjusting shaft member with its upper portion screwed over the wire grip; an adjusting dial positioned in a window hole formed at a lower portion of the lock case and screwed over the adjusting shaft member; and a coil spring provided in a compressed state between a lower end of the wire retaining member and an upper end of the adjusting shaft member, wherein a height position of the lock case with respect to the wire rope can be adjusted by turning the adjusting dial, a scale hole is formed in a side wall of a middle portion of the lock case, a scale is provided on an edge face of the scale hole, and a stopper pin protruding from the adjusting shaft member and penetrating an intermediate portion of the adjusting shaft member is inserted into the scale hole so that an amount of adjustment of the height position of the lock case can be known.

BRIEF DESCRIPTION OF THE DRAWINGS

FIG. 1 is a schematic front view of exhibition of pictures or the like in an art gallery, a museum, or the like.

EMBODIMENT

A concrete embodiment of the present invention shown in the accompanying drawings will be described below in detail.

Figure 1:
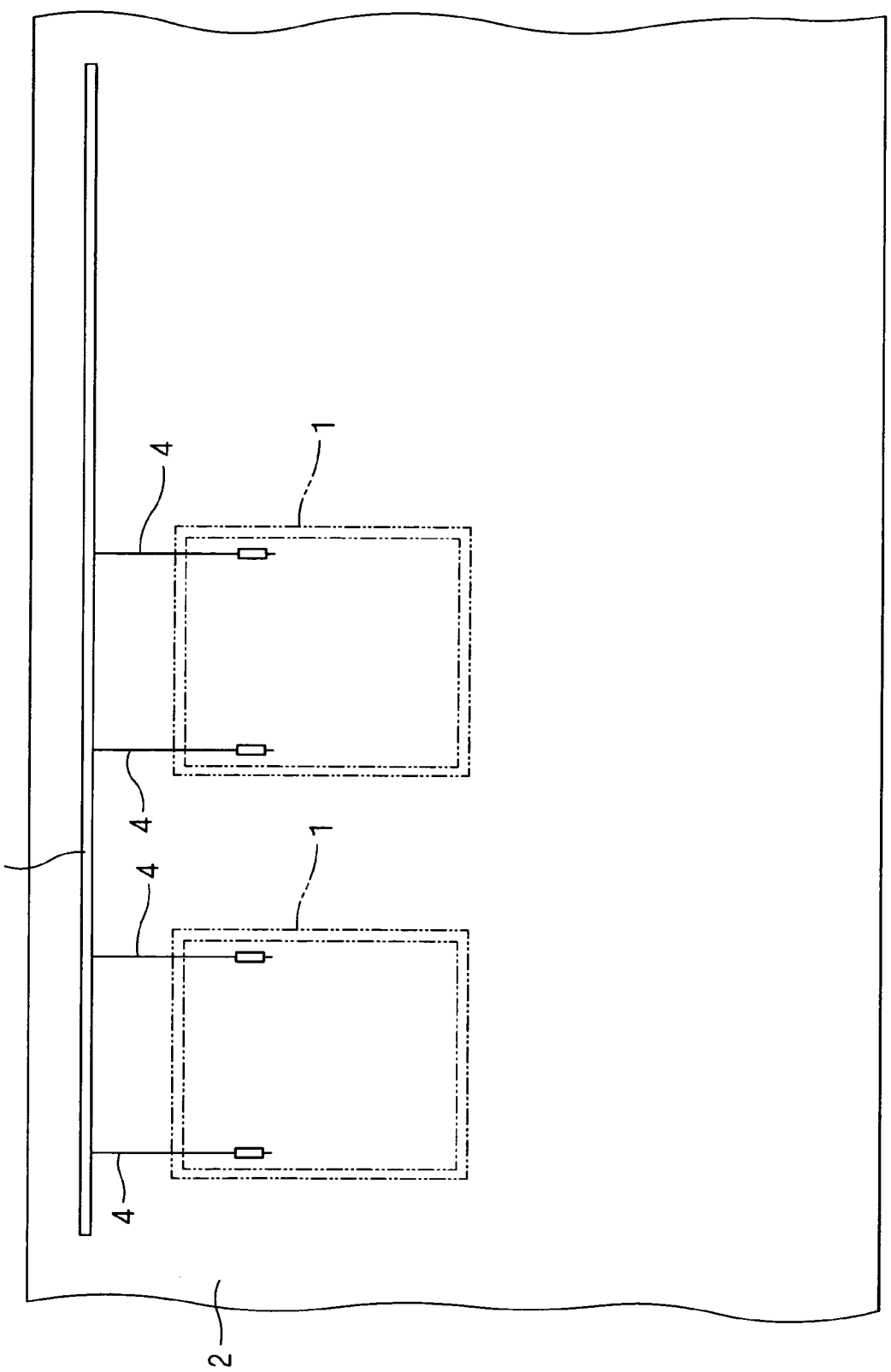
Figure 2:
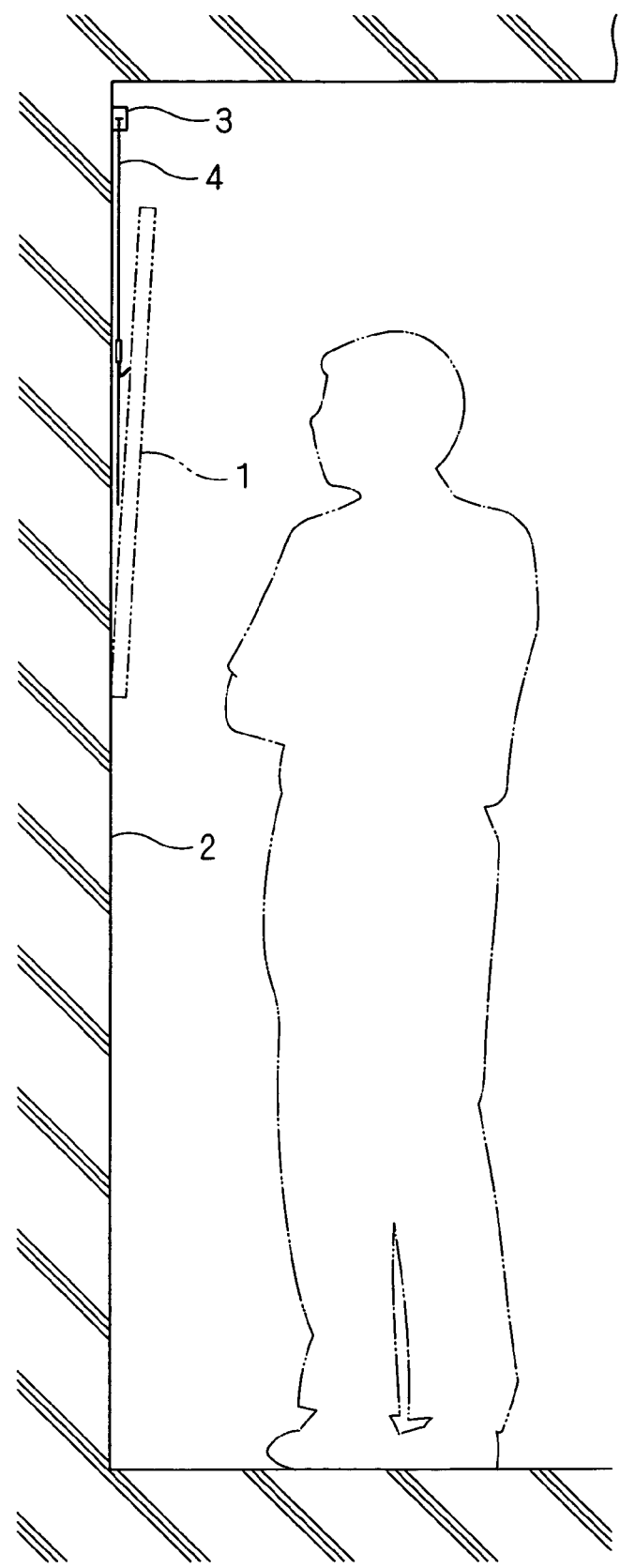
FIG. 2 is a left side view of FIG. 1.
Figure 3:
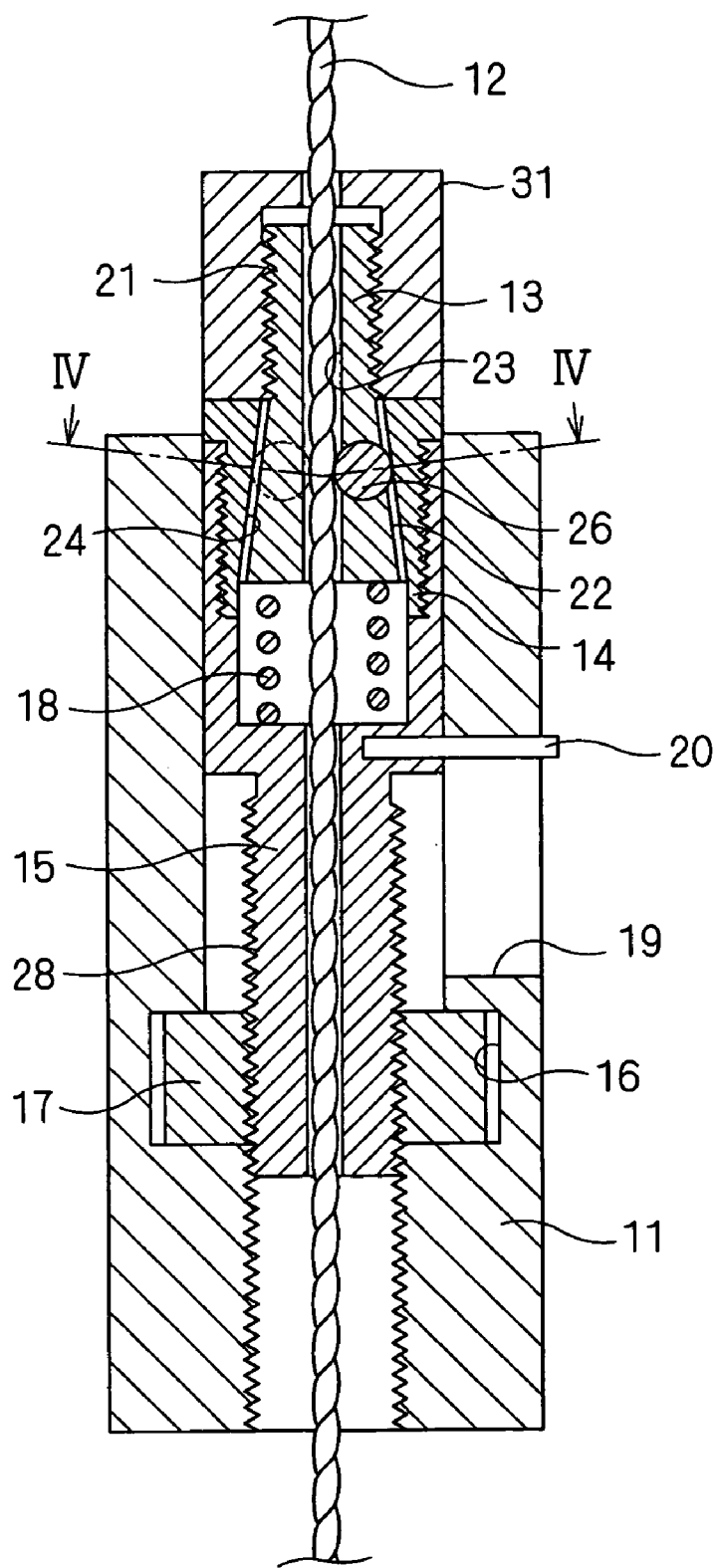
FIG. 3 is a sectional view of an essential portion of the present invention.
Figure 4:
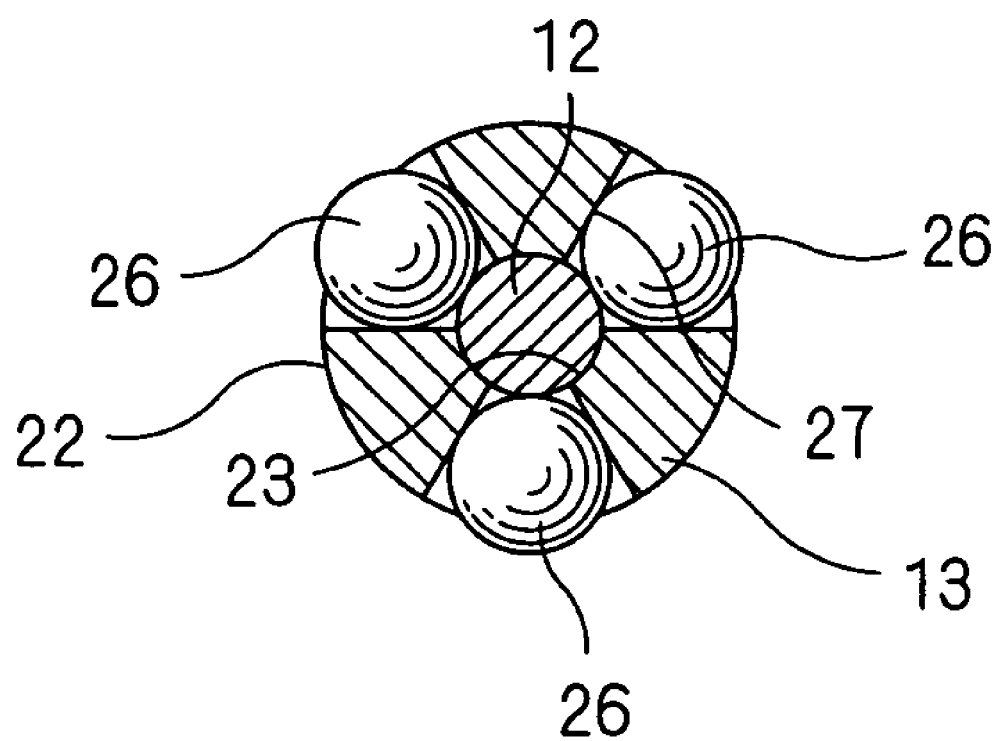
FIG. 4 is a sectional view taken along a line IV-IV in FIG. 3.
Figure 5:
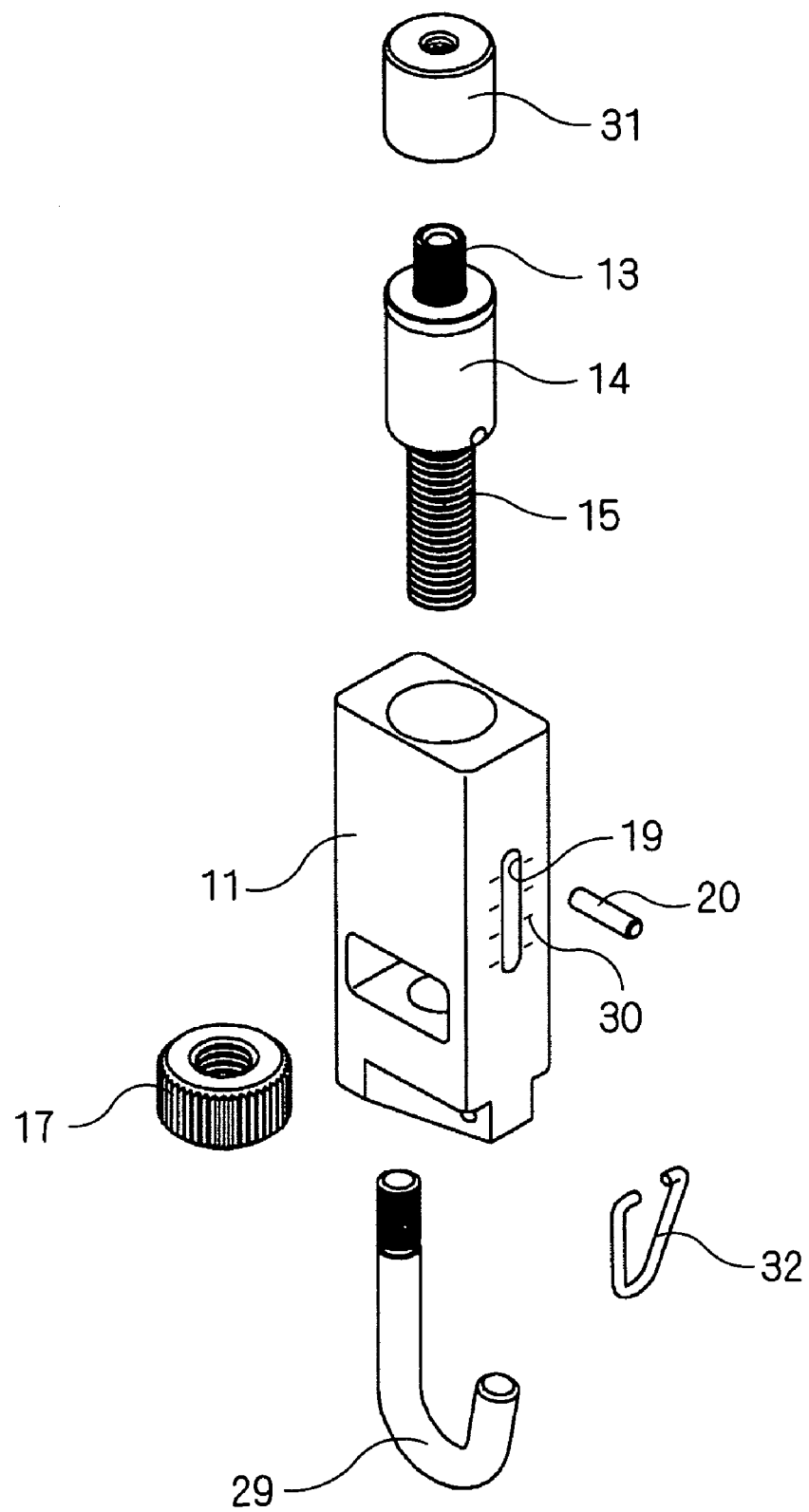
FIG. 5 is an exploded perspective view of FIG. 3.

FIG. 3 is a sectional view of an essential portion of the invention, FIG. 4 is a sectional view taken along a line IV-IV in FIG. 3, and FIG. 5 is an exploded perspective view.

The invention is a hanger including: a wire retaining member 13 which is housed in a lock case 11 and through which wire rope 12 is inserted; a cylindrical wire grip 14 fitted over a lower portion of the wire retaining member 13 and having a wire grip mechanism together with the wire retaining member 13; an adjusting shaft member 15 with its upper portion screwed over the wire grip 14; an adjusting dial 17 positioned in a window hole 16 formed in a lower portion of the lock case 11 and screwed over the adjusting shaft member 15; and a coil spring 18 provided in a compressed state between a lower end of the wire retaining member 13 and an upper end of the adjusting shaft member 15. By turning the adjusting dial 17, a height position of the lock case 11 with respect to the wire rope 12 is adjusted. A scale hole 19 is formed in a side wall of a middle portion of the lock case 11. A scale 30 is provided on an edge face of the scale hole 19. A stopper pin 20 protruding from an upper portion of the adjusting shaft member 15 and penetrating an intermediate portion of the adjusting shaft member 15 is inserted into the scale hole 19 so that an amount of adjustment of the height position of the lock case 11 can be known. Therefore, it is possible to hang an object by using the wire rope 12 and then easily adjust the height position of the object.

The lock case 11 is in a shape of a cube and houses the wire retaining member 13, the wire grip 14, the adjusting shaft member 15, the adjusting dial 17, and the stopper pin 20.

An upper end of the wire rope 12 is attached to a rail 3 through a hook or the like for an exhibit and the wire rope 12 is inserted through the wire retaining member 13 and the adjusting shaft member 15 to extend from a lower end of the lock case 11. After the exhibit 1 is hung, if the exhibit 1 is distorted and requires height adjustment, it is possible to adjust the height position of the exhibit 1 with respect to the wire rope 12.

A thread 21 is formed at an upper shaft portion of the wire retaining member 13, a lower portion of the wire retaining member 13 is formed into a tapered face 22 with its diameter increasing downward, and an insertion hole 23 for the wire rope 12 is formed in an axial direction of a center shaft.

The wire grip 14 is a cylindrical body and is formed to have a tapered face 24 so that the wire grip 14 can be fitted over the lower portion of the wire retaining member 13.

Between the wire retaining member 13 and the wire grip 14, the wire grip mechanism is provided.

A portion where balls 26 are mounted is shown in a section along the line IV-IV in FIG. 3 and FIG. 4 is the sectional view of it.

Recessed portions 27 are formed in three equally-spaced positions of the tapered face 22. Balls 26 are placed in the recessed portions 27 and are brought into contact with the wire rope 12 positioned in the insertion hole 23 and parts of balls 26 are allowed to protrude from the tapered face 22.

The wire grip 14 is fitted over the lower portion of the wire retaining member 13 to press the balls 26 with its tapered face 24. When a user tries to pull out the wire rope 12 upward, the wire retaining member 13 is biased upward by the coil spring 18 and the balls 26 move inward due to the tapered face 24 and bite into the wire rope 12 to thereby prevent movement of it. On the other hand, if the user stuffs in the wire rope 12 downward, the wire retaining member 13 and the balls 26 easily move downward against the biasing force of the coil spring 18 and the user can easily stuff in the wire rope 12 downward. If the user stops downward stuffing-in, the wire retaining member 13 and the balls 26 move upward due to the biasing force of the coil spring 18 and the wire retaining member 13 and the wire grip 14 are integrated with each other by the balls 26.

The adjusting shaft member 15 has a lower portion in a shape of a columnar rod and the upper portion in a shape of an open cylinder and an inner peripheral face of the upper portion is formed with a thread to be screwed over an outer periphery of the wire grip 14. In the window hole 16 at the lower portion of the lock case 11, the disk-shaped adjusting dial 17 an outer periphery of which is knurled for rotation is positioned and is screwed over the adjusting shaft member 15.

The scale hole 19 in a shape of an elongated hole is formed in the side wall of the middle portion of the lock case 11. The stopper pin 20 protruding from the adjusting shaft member 15 and penetrating the intermediate portion of the adjusting shaft member 15 is allowed to protrude and inserted into the scale hole 19.

If the adjusting dial 17 is rotated clockwise, the adjusting shaft member 15 is a right-hand screw and therefore moves down. If the adjusting dial 17 is rotated counterclockwise, the adjusting shaft member 15 moves up. Thus, the height position of the lock case 11 is adjusted with respect to the wire rope 12 hung from the rail 3 to thereby adjust the height of the exhibit 1 hung on a hook 29 fixed by screwing to the lock case 11.

In order to pull the wire rope 12 downward from the lock case 11 and fix the wire rope 12 in this state, a fixing cap 31 is fastened by screwing to an upper portion of the wire retaining member 13. The fixing cap 31 is fastened by screwing by determining an approximate length of the wire rope 12 from the rail 3 to the exhibit 1 (in a range of about 1 mm).

If the adjusting dial 17 is rotated clockwise, the adjusting shaft member 15 moves downward while the stopper pin 20 is guided by the scale hole 19, the lock case 11 and the hook 29 move upward, and the exhibit 1 moves upward. If the adjusting dial 17 is rotated counterclockwise, the adjusting shaft member 15 moves upward, the lock case 11 and the hook 29 move downward, and the exhibit 1 moves downward.

The scale 30 is provided on the edge face of the scale hole 19 so that the amount of adjustment can be known from a position of the stopper pin 20. The amount of adjustment of the exhibit 1 such as the picture is preferably about 15 mm. After determining the length of the wire rope 12 by the fixing cap 31, fine adjustment is made by using the adjusting dial 17.

A gate pin 32 is made of wire, formed into a substantially V shape, rotatably attached to the lower portion of the lock case 11, and has a function of preventing wire or the like of the exhibit 1 from coming off of the hook 29.

Figure 6:
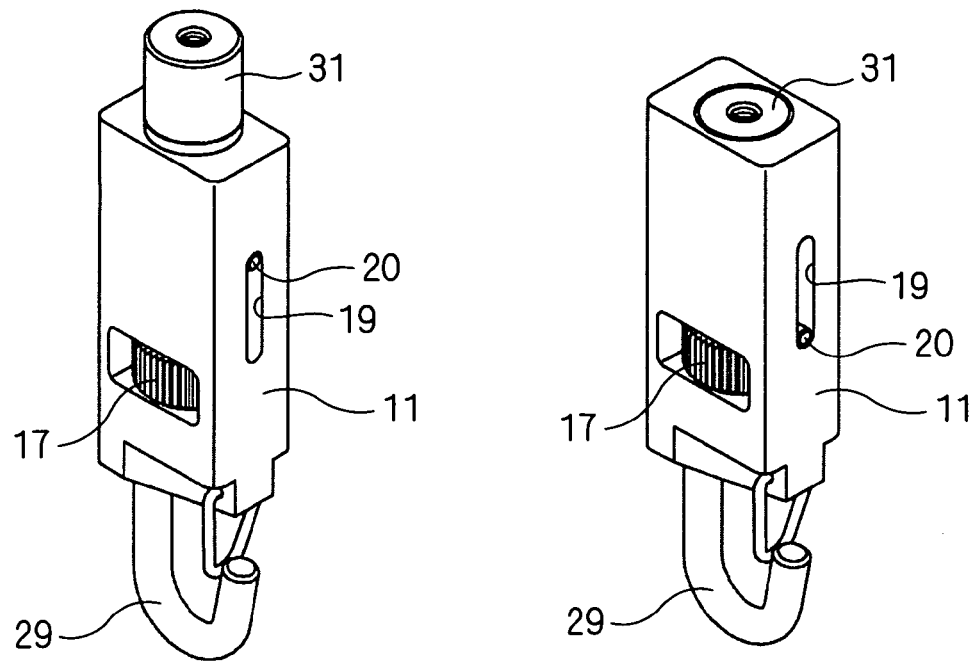
FIG. 6 shows a state in which a stopper pin is positioned at the uppermost end of a scale hole (a lowermost adjustment position of an exhibit 1) and a state in which the stopper pin is positioned at the lowermost end of the scale hole (an uppermost adjustment position of the exhibit 1) on left and right sides. Drawings on an upper side are perspective views of an outward appearance and drawings on a lower side are sectional perspective views.
Figure 6:
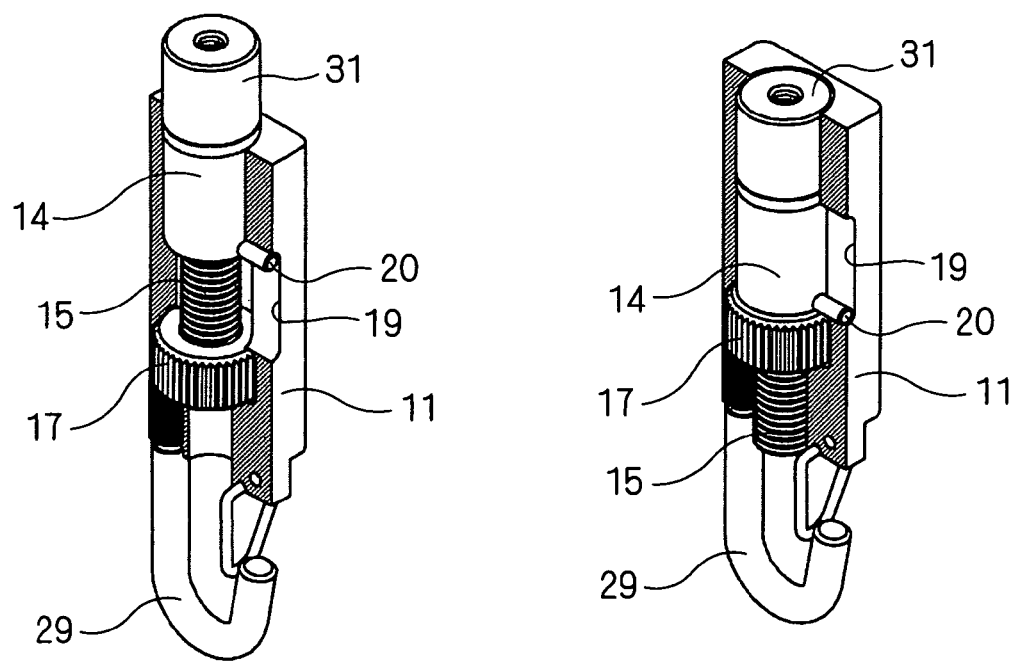

FIG. 6 shows a state in which the stopper pin 20 is positioned at the uppermost end of the scale hole 19 (a lowermost adjustment position of the exhibit 1) and a state in which the stopper pin 20 is positioned at the lowermost end of the scale hole 19 (an uppermost adjustment position of the exhibit 1) on left and right sides. Drawings on an upper side are perspective views of an outward appearance and drawings on a lower side are sectional perspective views.

Figure 7:
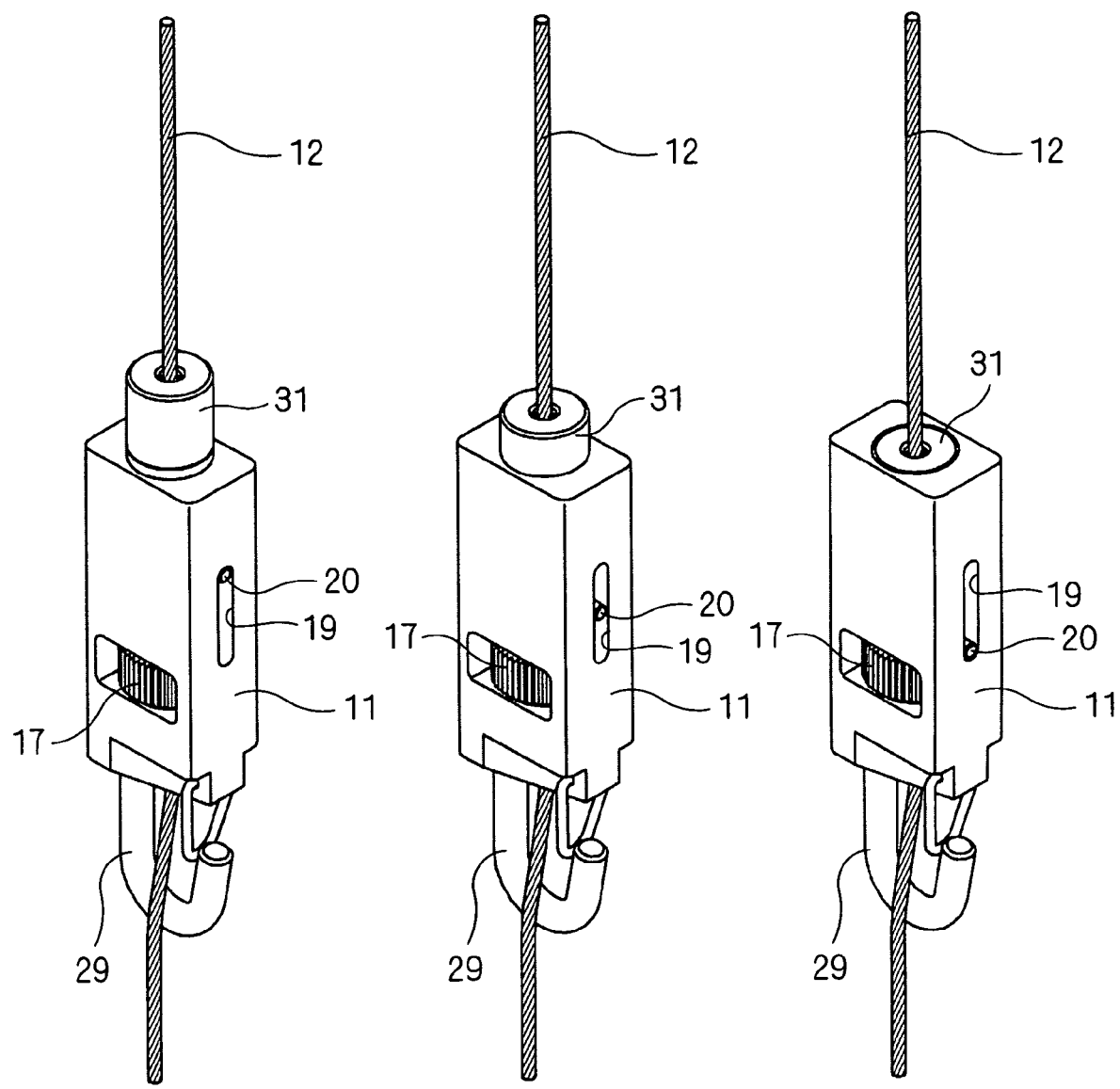
FIG. 7 shows a state in which wire rope is inserted through a lock case and the stopper pin is positioned in the uppermost end of the scale hole (the lowermost adjustment position of the exhibit 1), a state in which the stopper pin is positioned at a midpoint of the scale hole, and a state in which the stopper pin is positioned in the lowermost end of the scale hole (the uppermost adjustment position of the exhibit 1) on a left side, in the middle, and on a right side and in perspective views of the outward appearance.

FIG. 7 shows a state in which the wire rope 12 is inserted through the lock case 11 and the stopper pin 20 is positioned in the uppermost end of the scale hole 19 (the lowermost adjustment position of the exhibit 1), a state in which the stopper pin 20 is positioned at a midpoint of the scale hole 19, and a state in which the stopper pin 20 is positioned in the lowermost end of the scale hole 19 (the uppermost adjustment position of the exhibit 1) on a left side, in the middle, and on a right side and in perspective views of the outward appearance.

Figure 8:
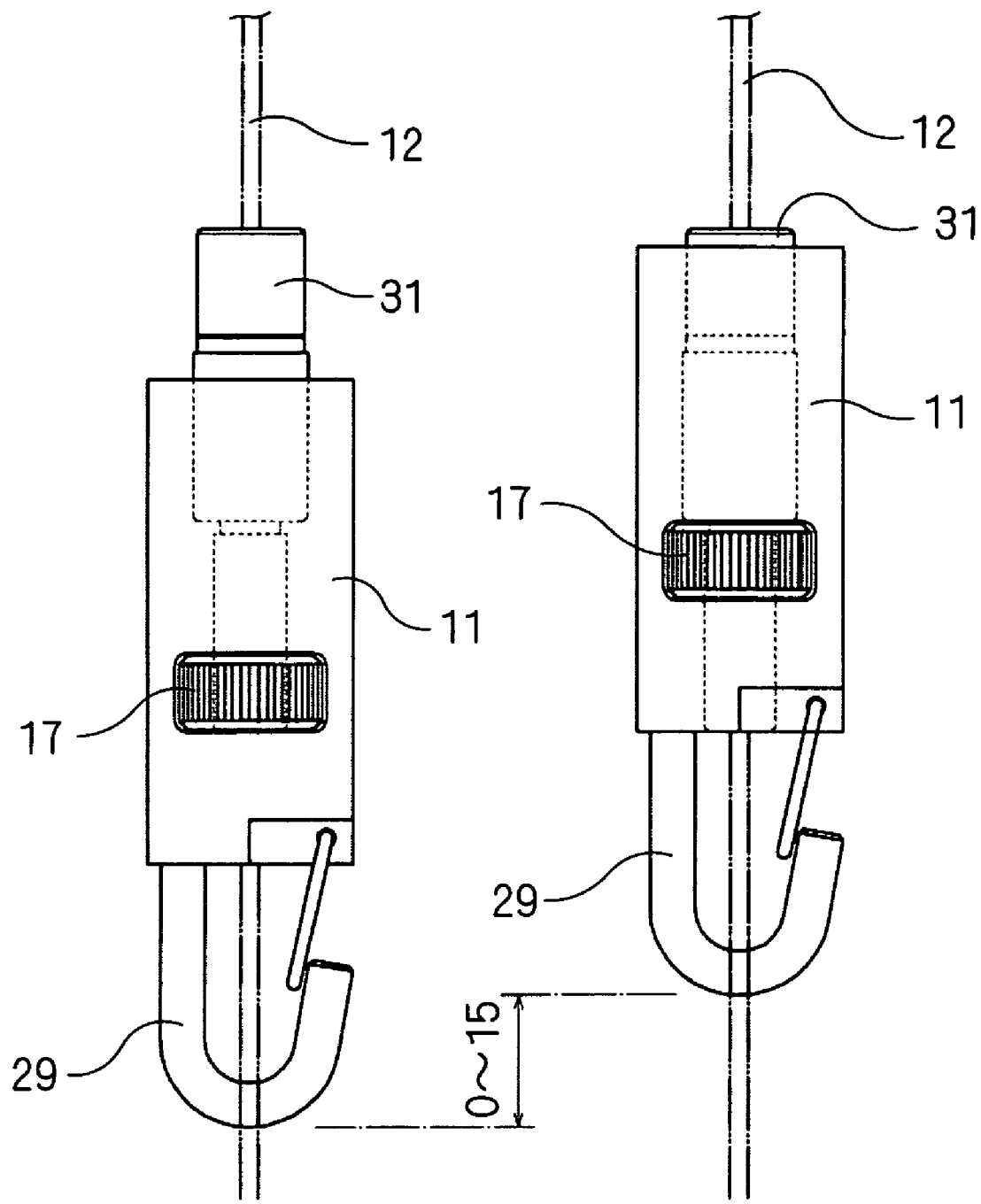
FIG. 8 shows a state in which the stopper pin is positioned at the upper end of the scale hole (the lowermost adjustment position of the exhibit 1) and a state in which the stopper pin is positioned at the lower end of the scale hole (the uppermost adjustment position of the exhibit 1) when the lock case is fixed in the same height position of the wire rope by a fixing cap on left and right sides and in front views.

FIG. 8 shows a state in which the stopper pin 20 is positioned at the upper end of the scale hole 19 (the lowermost adjustment position of the exhibit 1) and a state in which the stopper pin 20 is positioned at the lower end of the scale hole 19 (the uppermost adjustment position of the exhibit 1) when the lock case 11 is fixed in the same height position of the wire rope 12 by the fixing cap 31 on left and right sides and in front views.

Example 1

A size of the lock scale is 21.5 mm×55 mm×15 mm, a diameter of the wire rope is 1.5 mm, a minimum adjustment height is 87 mm, a maximum adjustment height is 102 mm, and the amount of adjustment is 15 mm.

Although the invention is mainly used as the hanger for adjusting the height of the exhibited position of the exhibit in the art gallery, the museum, or the like, the invention can be applied to an industrial support member for hanging by using wire rope and for height adjustment.

As described above, the invention is the hanger with the wire rope inserted through the lock case and having the wire grip mechanism and the hook, wherein the height position of the lock case with respect to the wire rope can be adjusted after the object is hung on the hook. Therefore, it is possible to hang the object by using the wire rope and then easily adjust the height position of the object.

Moreover, the invention is the hanger with the wire rope inserted through the lock case and having the wire grip mechanism and the hook, wherein the height position of the lock case with respect to the wire rope can be adjusted after the object is hung on the hook and the hanger has the scale for indicating the amount of height adjustment. Therefore, it is possible to hang the object by using the wire rope and then easily adjust the height position of the object.

Furthermore, the invention is the hanger comprising: the wire retaining member which is housed in the lock case and through which the wire rope is inserted; the cylindrical wire grip fitted over the lower portion of the wire retaining member and having the wire grip mechanism together with the wire retaining member; the adjusting shaft member with its upper portion screwed over the wire grip; the adjusting dial positioned in the window hole formed at the lower portion of the lock case and screwed over the adjusting shaft member; and the coil spring provided in the compressed state between the lower end of the wire retaining member and the upper end of the adjusting shaft member, wherein the height position of the lock case with respect to the wire rope can be adjusted by turning the adjusting dial. Therefore, it is possible to hang the object by using the wire rope and then easily adjust the height position of the object.

Moreover, the invention is the hanger comprising: the wire retaining member which is housed in the lock case and through which the wire rope is inserted; the cylindrical wire grip fitted over the lower portion of the wire retaining member and having the wire grip mechanism together with the wire retaining member; the adjusting shaft member with its upper portion screwed over the wire grip; the adjusting dial positioned in the window hole formed at the lower portion of the lock case and screwed over the adjusting shaft member; and the coil spring provided in the compressed state between the lower end of the wire retaining member and the upper end of the adjusting shaft member, wherein the height position of the lock case with respect to the wire rope can be adjusted by turning the adjusting dial, the scale hole is formed in the side wall of the middle portion of the lock case, the scale is provided on the edge face of the scale hole, and the stopper pin protruding from the upper portion of the adjusting shaft member and penetrating the intermediate portion of the adjusting shaft member is inserted into the scale hole so that the amount of adjustment of the height position of the lock case can be known. Therefore, it is possible to hang the object by using the wire rope and then easily adjust the height position of the object.

What is claimed is:

1. A hanger comprising:
a wire retaining member which is housed in a lock case and through which wire rope is inserted;
a cylindrical wire grip fitted over a lower portion of the wire retaining member and having a wire grip mechanism together with the wire retaining member;
an adjusting shaft member with an upper portion thereof screwed over the wire grip;
an adjusting dial positioned in a window hole formed at a lower portion of the lock case and screwed over the adjusting shaft member; and
a coil spring provided in a compressed state between a lower end of the wire retaining member and an upper end of the adjusting shaft member,
wherein a height position of the lock case with respect to the wire rope can be adjusted by turning the adjusting dial.

2. A hanger comprising:
a wire retaining member which is housed in a lock case and through which wire rope is inserted;
a cylindrical wire grip fitted over a lower portion of the wire retaining member and having a wire grip mechanism together with the wire retaining member;
an adjusting shaft member with an upper portion thereof screwed over the wire grip;
an adjusting dial positioned in a window hole formed at a lower portion of the lock case and screwed over the adjusting shaft member; and
a coil spring provided in a compressed state between a lower end of the wire retaining member and an upper end of the adjusting shaft member,
wherein a height position of the lock case with respect to the wire rope can be adjusted by turning the adjusting dial, a scale hole is formed in a side wall of a middle portion of the lock case, a scale is provided on an edge face of the scale hole, and a stopper pin protruding from an upper portion of the adjusting shaft member an penetrating an intermediate portion of the adjusting shaft member is inserted into the scale hole so that an amount of adjustment of the height position of the lock case can be known.

* * * * *

UNITED STATES PATENT AND TRADEMARK OFFICE
CERTIFICATE OF CORRECTION

| | | |
|---|---|---|
| PATENT NO. | : 7,657,976 B2 | Page 1 of 1 |
| APPLICATION NO. | : 11/516636 | |
| DATED | : February 9, 2010 | |
| INVENTOR(S) | : Nobuo Nakamura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 681 days.

Signed and Sealed this

Thirtieth Day of November, 2010

David J. Kappos
*Director of the United States Patent and Trademark Office*